Sept. 29, 1964     G. R. FUNK ETAL     3,150,593
METERING PUMP
Filed April 24, 1961     2 Sheets-Sheet 2
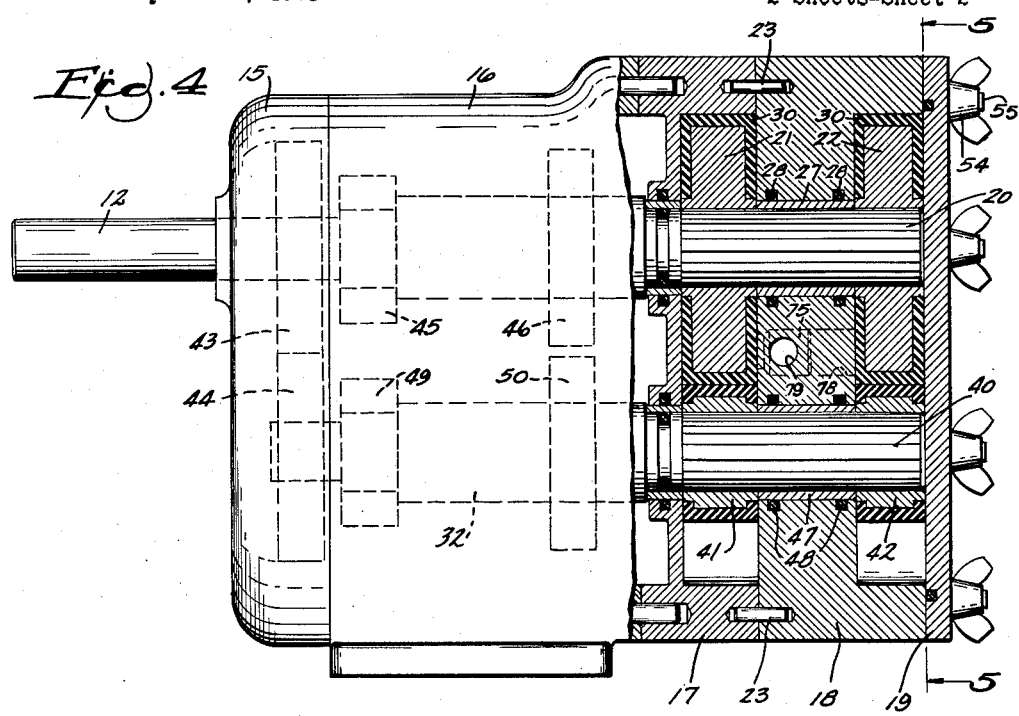
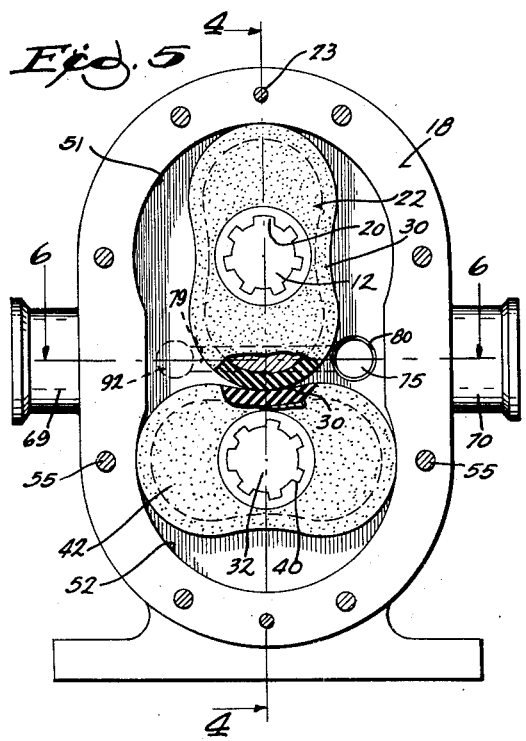
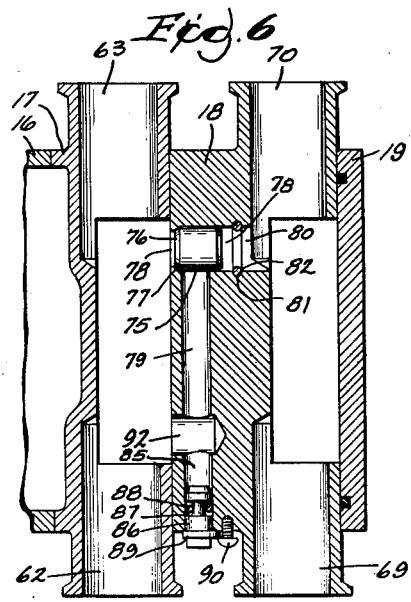
INVENTORS
GILBERT R. FUNK
ROBERT E. HOLTGRIEVE
BY
Wheeler, Wheeler & Wheeler
ATTORNEYS

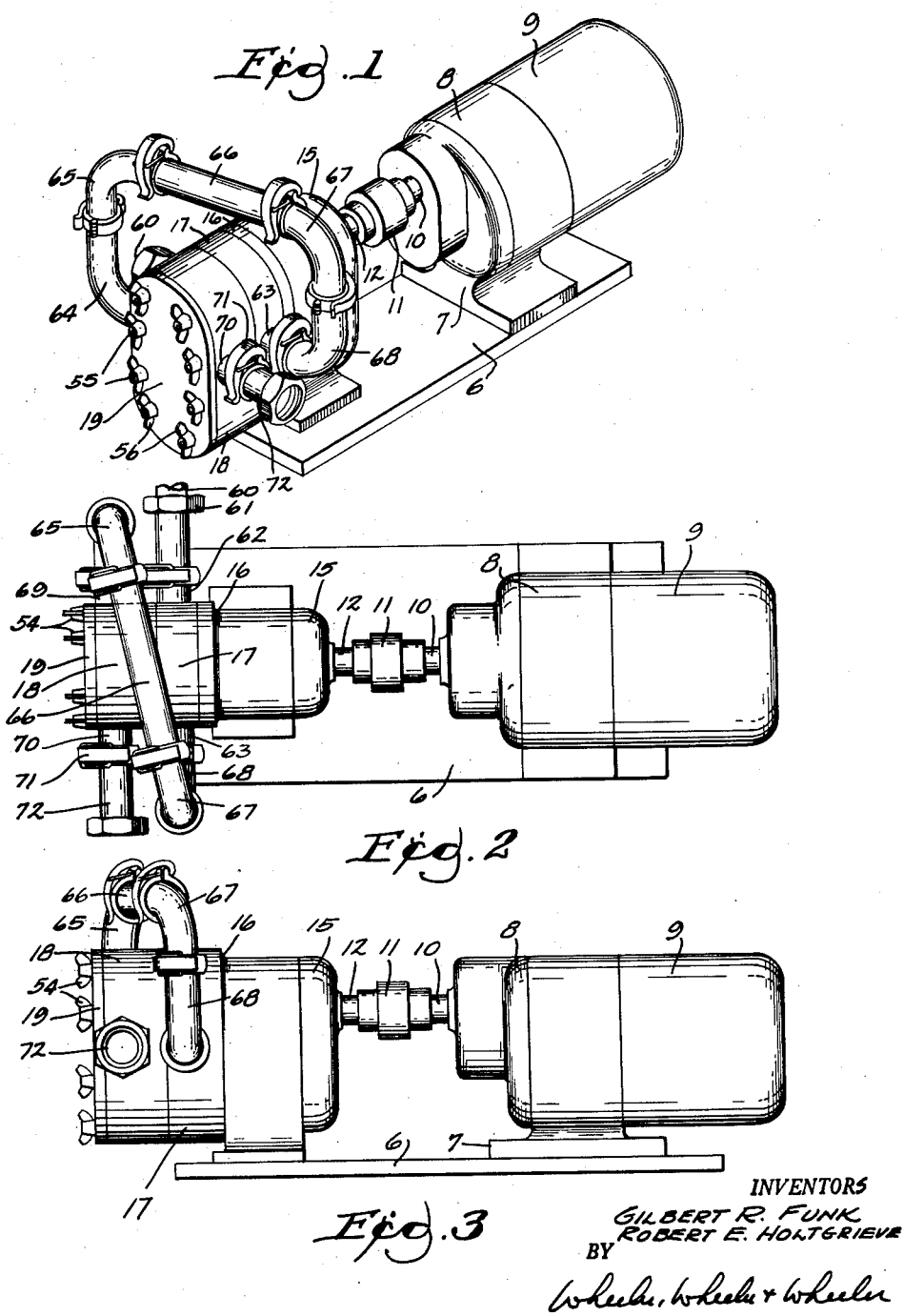

United States Patent Office

3,150,593
Patented Sept. 29, 1964

3,150,593
METERING PUMP
Gilbert R. Funk and Robert E. Holtgrieve, Waukesha, Wis., assignors to Waukesha Foundry Company, Waukesha, Wis., a corporation of Wisconsin
Filed Apr. 24, 1961, Ser. No. 105,138
5 Claims. (Cl. 103—5)

This invention relates to a metering pump and is particularly useful where maximum accuracy is desired and compact form is advantageous. The embodiment disclosed is specifically designed for use in the food industry and therefore contains features which may not be required for other purposes.

For metering accuracy, there is a primary pump which supplies the necessary head pressure and a metering pump across which pressures are balanced so that there is no slip. In practice, the primary pump has higher volumetric capacity than the secondary or metering pump. In such a device, the primary pump is relied upon to supply all requisite pressure but the flow is in precise accordance with the displacement of the metering pump. The pumps used are positive displacement type pumps of the dual vane type and their rotors are mounted on the same shaft, thus eliminating any inaccuracy due to gearing or other connections between pumps.

Mounting the rotors on the same shafts has a further and major advantage in reducing expense of manufacture and resulting in a very compact design, the casing of one pump serving as a closure for the casing of the other and the several pump casings and the closure for the series of casings all being bolted together.

A feature of the present invention is the particular structure and arrangement of the flow-balancing bypass and valve. The bypass is entirely internal and is nevertheless so designed that all parts thereof are readily accessible for cleaning as required in sanitary pump practice. The pressure-balancing port extends directly between the pressure connections of the respective pumps, opening into the bypass of the duct at the point where the bypass duct communicates with the pressure connection of the primary pump. The pressure-balancing valve floats in this port and is readily removable therefrom, leaving the port entirely open for cleaning when the pump is disassembled.

In a pump made in accordance with this invention, a meter connected with the common shafting will accurately reflect the exact amount of liquid or semi-liquid material pumped. The delivery capacity of the primary pump slightly exceeds the delivery capacity of the metering pump and the excess is bypassed until the pressure across the metering pump is at zero. Thus, although both pumps are on the same shaft, the amount delivered from the series-connected pumps will necessarily be the exact amount displaced by the metering pump and this, in turn, will necessarily be reflected identically in the number of rotations of the shaft.

In the drawings:

FIG. 1 is a view in perspective of a device embodying the invention.

FIG. 2 is a plan view of the device shown in FIG. 1.

FIG. 3 is a view in side elevation of the device shown in FIG. 1.

FIG. 4 is an enlarged detail view of the pump assembly and gear housing partly in side elevation and partly in section on the line 4—4 of FIG. 5.

FIG. 5 is a view taken in section on the line 5—5 of FIG. 4, portions of the impellers being broken away.

FIG. 6 is a view taken in section on the line 6—6 of FIG. 5.

Upon the base 6 is a support 7 for a gear reducer 8 which mounts the driving motor 9 and has its output shaft 10 connected by coupling 11 with the driving shaft 12 of the pump assembly.

The pump assembly comprises a gear case 15, a spacing unit 16, a primary pump casing 17, a metering pump casing 18 and a closure 19. On the splined portion 20 of shaft 12 there is a primary pump impeller 21 within pump casing 17 and a metering pump impeller 22 within pump casing 18. Pump casing 18 has dowel pins 23 locating it with respect to pump casing 17 and it serves as a closure for casing 17. A spacer sleeve 27 is mounted on the splined shaft section 20 between the impellers 21 and 22 not only to locate these impellers with respect to each other but to provide a cylindrical external surface for one or more O-rings 28 which provide packing between the two pumps.

The pumps are desirably of the construction shown in FIG. 5, each of the impellers having a rubber jacket 30 covering all exposed surfaces.

The pumps are of a known design in which the impellers have the general outline of a figure 8.

Offset from and parallel to the shaft 12 there is a second pump shaft 32 which has a splined portion 40 mounting an impeller 41 in pump casing 17 and an impeller 42 in pump casing 18 with an intervening spacer 47 corresponding to the spacing sleeve 27 and similarly provided with packing 48. Gears shown in dotted lines at 43 and 44 are disposed in the gear case 15 to provide a positive driving connection between shafts 12 and 32. Bearings for shaft 12 are provided at 45 and 46 in the spacer section 16 while similar bearings at 49 and 50 are provided for shaft 32.

Each of the pump casings comprises a generally cylindrical portion concentric with each of the shafts 12 and 32. In FIG. 5, there is a cylindrical chamber portion 51 concentric with shaft 12, the interior being wiped by the rubber jacket 30 of impeller 21. A like cylindrical portion 52 is concentric with shaft 32 and its inner periphery is wiped by the jacket of impeller 41. The respective impellers are offset angularly for ninety degrees about their respective shafts, each having a central portion of narrow cross section and of a contour to be wiped by the periphery of the complementary impeller as disclosed in United States Patent 2,279,136. This particular type of pump is a positive displacement pump with low leakage and is particularly designed for food handling because it does not produce as much foaming as some other types of pumps.

The several casings 15, 16 and 17, 18 and the closure 19 are demountably held in place by the wing nuts 54 on bolts 55 which extend through the entire series. This provision for facilitating disassembly and reassembly of the parts is a feature having specific utility in a food handling pump.

A supply pipe 60 for the material to be pumped leads through a detachable coupling 61 to the inlet 62 of the primary pump 17. The outlet connection 63 of pump casing 17 is connected by elbows 64, 65 to pipe 66 and elbows 67, 68 to the inlet 69 on the suction side of the metering pump 18. This casing and the rotors therein are identical with casing 17 and rotors 21 and 41 with the exception that rotors 22 and 42 in the metering casing 18 have slightly less axial extent, and therefore slightly less displacement than the rotors 21 and 41. The outlet 70 from metering pump casing 18 is connected by the quickly detachable coupling 71 with the discharge pipe 72 for the metered material. All pipes, fittings and T's are desirably provided with quickly detachable sanitary type couplings.

The pressure-balancing valve 75 (FIG. 6) is generally cylindrical but has a tapered end 76 engageable with valve seat 77. The valve 75 is reciprocable in a pressure-balancing port 78 that extends directly between the pressure side of the primary pump and the pressure side of the metering pump, opening through the valve seat into the primary pump. In its reciprocation, the valve controls bypass flow through a bypass duct 79 which leads laterally from the pressure-balancing port 78 to the inlet side of the primary pump. The entire duct 78, 79 is formed in the casing 18 of the metering pump, which serves as a closure for the primary pump. The beveled shoulder 77 referred to in the valve seat is a means of confining pressure-balancing valve 75 against undue displacement toward the primary pump. At the end 80 of the pressure-balancing port 78, where said port opens into the pressure side of the metering pump, a groove 81 in the wall of the port 78 receives a removable split ring 82 which serves as a stop to limit the movement of the valve body 75 to the right as viewed in FIG. 6.

The bypass duct 79 extends at 85 to the outside of housing 17. This makes the duct accessible for cleaning and is also a convenience in the production of the pump. The external connection is releasably closed by a plug 86 channeled at 87 to receive a ring seal 88. The plug has an eccentric flange 89 normally anchored beneath screw 90 but releasable by rotating the plug to withdraw from beneath the head of the screw the larger radius portion of flange 89, thus giving access to duct 79.

Duct 79 intersects bore 92 which is drilled into the ends of casing 18 to complete the communication of duct 79 with the low pressure or inlet side of the primary pump.

The balancing valve 75 floats in the balancing port 78 in response to the relative pressures of the primary pump and the metering pump. In the event that the metering pump pressure exceeds the balancing pump pressure (which is not normally the case), the valve 75 will shut off the bypass duct 79. In normal operation, the excess pressure of the primary pump will displace valve 75 from seat 77 thereby permitting part of the output of the primary pump to be bypassed from the pressure side to the inlet side of that pump through the duct 79. The valve 75 will float between the pressures of the two pumps at a point such that the output pressure of the primary pump is balanced to be identical with the output pressure of the metering pump due to the fact that the valve 75 will uncover just sufficient area of bypass duct 79 to bring about this balanced condition.

Under these circumstances, the outlet pressure from the metering pump is identical with its inlet pressure and hence material handled by the apparatus is passing through the metering pump with no slip. Under these conditions, the single drive shaft 12 upon which rotors 21 and 22 of the respective pumps are both mounted will deliver a known quantity of material for each revolution. Consequently, the revolutions of driven shaft 11 will be exactly proportional to the amount of material delivered by the pump system.

It will be observed that the apparatus is unusually compact, as compared with other pump-meter devices. Moreover, it is engineered for precision operation and for easy dismantling and reassembly, to facilitate cleaning. The fact that the casing of one pump serves as a closure for the casing of the other and the several casings and closures are all held together by a single set of bolts not only facilitates cleaning but is a factor in permitting manufacture at low cost.

We claim:

1. In a sanitary metering pump, the combination with a base of a pair of shafts operatively mounted in the base and having splined free end portions projecting laterally from the base, a first pump casing mounted on the base and having a closed side adjacent the base and an open side facing away from the base and through which said shafts extend, cooperating pump rotors upon the shafts within said first pump casing and terminating substantially flush therewith at the open side thereof, means including a second pump casing having a closed side for closing the first pump casing, said second casing having an open side remote from the first casing and into which second casing the free ends of said shafts project, cooperating pump rotors in the second pump casing and mounted upon the splined free ends of said shafts, a closure plate connected with the second pump casing and extending across said last mentioned pump rotors and across the free ends of the shafts, means for removably securing the closure plate to the second pump casing, the said last mentioned pump rotors being freely accessible upon removal of the closure plate from the second pump casing, means providing inlet and outlet connections for the respective pump casings, the inlet of the second pump casing being connected with the outlet of the first pump casing, the pump rotors in the first pump casing having a capacity in excess of the capacity of the rotors in the second pump casing, and means providing a valve controlled bypass from the outlet of the first pump casing to the inlet thereof.

2. The device of claim 1 in which said valve controlled bypass includes a pressure balancing duct extending between the outlets of the respective pumps and a passage provided with a floating pressure responsive valve reciprocable in said passage subject to relative pressures developed by the respective pumps and movable across the communication of said duct with said passage to provide valve-control for said bypass.

3. The device of claim 1 in further combination with spacing sleeves enclosing the splines of the free ends of the respective shafts between the pump rotors mounted on the shafts within the respective pump casings, and at least one packing ring encircling one such sleeve, the said last mentioned sleeve and the means for closing the first pump casing having seal means protected by the sleeve from contact with a splined portion of the corresponding shaft.

4. In a pump, the combination with means providing a pair of spaced pumping chambers and separate pump rotors aligned in the respective chambers, of a common shaft for said rotors having continuous splines extending through and between the respective chambers and upon which the rotors are mounted, and means separating said chambers between said rotors and providing at least one annular seal bearing surface concentric with the shaft, a seal ring engaging said surface, and a sleeve embracing the splines of the shaft and extending along the shaft between the pump rotors in the respective chambers and having a surface of substantially circular outline and with which the seal ring is engaged and whereby it is protected from contact with the splines of said shaft.

5. A pump according to claim 4 in which said sleeve extends continuously from one of said rotors to the other and terminally abuts the rotors, the means separating the chambers having at least two seal ring grooves between the rotors, there being a seal ring in each and the sleeve having peripheral portions engaged by both seal rings.

(References on following page)

References Cited in the file of this patent

UNITED STATES PATENTS

| | | |
|---|---|---|
| 796,724 | Hewitt | Aug. 8, 1905 |
| 1,218,300 | Nelson | Mar. 6, 1917 |
| 1,477,850 | Pool | Dec. 18, 1923 |
| 2,382,042 | Etnyre | Aug. 14, 1945 |
| 2,567,699 | Devlin | Sept. 11, 1951 |
| 2,796,240 | Miller | June 18, 1957 |
| 2,857,848 | McLean | Oct. 28, 1958 |
| 2,936,716 | Looker | May 17, 1960 |
| 2,971,339 | Gold | Feb. 14, 1961 |
| 2,980,028 | Edwards | Apr. 18, 1961 |

FOREIGN PATENTS

| | | |
|---|---|---|
| 996,156 | France | Aug. 29, 1951 |
| 1,145,659 | France | May 13, 1957 |
| 415,561 | Italy | Oct. 21, 1946 |
| 202,622 | Switzerland | May 1, 1939 |
| 611,465 | Great Britain | Oct. 29, 1948 |